United States Patent [19]

Campbell et al.

[11] Patent Number: 4,904,154
[45] Date of Patent: Feb. 27, 1990

[54] LOADING SYSTEM FOR RAILROAD CARS

[75] Inventors: John A. L. Campbell, Oklahoma City, Okla.; Robert L. Elder, Columbus, Miss.; Tony G. Gardner, Oklahoma City, Okla.; Jerry L. Hughes, Gillette, Wyo.; Kenneth E. Krause, Edmond; Ronald K. Pepper, Moore, both of Okla.

[73] Assignee: Kerr-McGee Coal Corporation, Oklahoma City, Okla.

[21] Appl. No.: 266,852

[22] Filed: Nov. 3, 1988

[51] Int. Cl.⁴ .............................................. B65G 67/22
[52] U.S. Cl. .................................... 414/786; 177/163; 177/122; 177/25.13; 141/83; 141/94; 222/64; 414/397; 414/329; 414/21
[58] Field of Search .................... 141/83, 98, 231, 232, 141/233, 94, 95, 96, 192, 198; 177/25, 163, 122, 123, 59; 414/328, 329, 397, 21, 786; 222/56, 77, 64

[56] References Cited

U.S. PATENT DOCUMENTS

| 2,954,202 | 9/1960 | Bale, Jr. .......................... 177/122 X |
| 3,393,757 | 7/1968 | Tonies ........................... 177/25.13 X |
| 4,094,367 | 6/1978 | Jones et al. ..................... 177/163 X |
| 4,445,581 | 5/1984 | Caldicott ........................... 177/163 |
| 4,460,308 | 7/1984 | Moon et al. ........................ 414/786 |
| 4,629,392 | 12/1986 | Campbell et al. .................. 414/786 |

FOREIGN PATENT DOCUMENTS

| 627038 | 10/1978 | U.S.S.R. ............................. 414/329 |
| 643408 | 1/1979 | U.S.S.R. ............................. 414/329 |
| 661254 | 5/1979 | U.S.S.R. ............................. 177/123 |
| 880929 | 11/1981 | U.S.S.R. ............................. 414/21 |
| 1291517 | 2/1987 | U.S.S.R. ............................. 414/329 |

Primary Examiner—Frank E. Werner
Attorney, Agent, or Firm—William G. Addison; Herbert M. Hanegan

[57] ABSTRACT

A system for loading coal (particles) into railroad cars 16 wherein a control weight of a railroad car 16 loaded with coal (particles) is established and a maximum permissible weight of a railroad car 16 loaded with coal (particles) is known, the control weight being less than the maximum permissible weight, The system utilizes a continuous loading system 12 and a batch loading system 14. Coal (particles) first is loaded into each of the railroad cars 16 utilizing the continuous loading system 12 and the continuous loading system 12 is designed such that the continuous loading system 12 loads an amount of coal (particles) into each of the railroad cars 16 having a weight less than the predetermined control weight. After coal (particles) intially has been loaded into each of the railroad cars 16 by the continuous loading system 12, then coal (particles) is loaded into each of the railroad cars 16 utilizing the batch loading system 14 and the batch loading system 14 is operated to discharge an amount of coal (particles) into each of the railroad cars 16 equal to the difference between the control weight and the partially loaded weight of the railroad cars 16 after initially being filled utilizing the continuous loading system 12.

16 Claims, 1 Drawing Sheet

LOADING SYSTEM FOR RAILROAD CARS

FIELD OF THE INVENTION

The present invention relates generally to systems for loading particles into railroad cars and, more particularly, but not by way of limitations, to a system for loading particles into railroad cars wherein each railroad car initially is loaded with particles from a continuous loading system in an amount such that each railroad car with the particles has a partially filled weight less than a control weight and each railroad car then is loaded with particles from a batch loading system so each railroad car has a filled weight about equal to the control weight.

BRIEF DESCRIPTION OF THE DRAWINGS

The single FIGURE in the drawings is a diagramatic, schematic view of the system of the present invention for loading particles into railroad cars showing some of the railroad cars of a unit train in various positions.

DESCRIPTION OF THE PREFERRED EMBODIMENTS

In U.S. Pat. No. 4,460,308, issued to Moon, et al., July 17, 1984, a system for loading particles into railroad cars was described wherein the particles were discharged into the railroad cars from chutes. In this system, the weight of each railroad car loaded with particles was determined to establish a filled weight of each railroad car. This filled weight was compared with a control weight to determine a differential weight. The loading of particles then was adjusted to vary the weight of the particles loaded into the next railroad car so the filled weight of the next railroad car more nearly approximated the control weight. This was a continuous loading system wherein the weight of the particles discharged from the discharge chute was a function of the size of the discharge chute and time. The disclosure of this patent, U.S. Pat. No. 4,460,308, hereby specifically is incorporated herein by reference.

In U.S. Pat. No. 4,629,392, issued to Campbell, et al., Dec. 16, 1986, another system for loading particles into railroad cars was disclosed wherein the weight of each railroad car prior to loading particles was determined to establish an unfilled weight. This unfilled weight was compared with a control weight to determine an unfilled differential weight. Particles then were discharged from a surge bin into a weigh bin until an amount of particles about equal to the unfilled differential weight had been loaded into the weigh bin. The particles loaded in the weigh bin having a weight about equal to the unfilled differential weight then was discharged from the weigh bin into the appropriate railroad car. This system thus was a batch loading type of system. The disclosure of this patent, U.S. Pat. No. 4,629,392, hereby specifically is incorporated herein by reference.

The continuous loading system described before with respect to U.S. Pat. No. 4,460,308, was designed to load a weight of particles into each railroad car so the filled weight of each railroad car was as close as possible to the control weight without exceeding the control weight. However, typical of such continuous loading systems, the filled weights of the railroad cars varied, with some of the filled weights being below the control weight, some of the filled weights being above the control weight and most of the filled weights being distributed generally about the control weight, the filled weights being distributed within a somewhat bell-shaped curve. Further, in spite of the controls, some of the filled weights exceed the maximum permissible weight.

The batch loading system described before with respect to U.S. Pat. No. 4,629,392, provided a more accurate means for loading a predetermined weight of particles into railroad cars, as compared to the continuous loading system described in U.S. Pat. No. 4,460,308.

In the past, if one had a continuous loading type of system and if one desired to increase the accuracy of the weight of particles loaded into each of the railroad cars, one could abandon the continuous loading system and construct an entirely new batch loading system. This resulted in a substantial investment for new batch loading equipment and generally required substantial downtime.

The present invention provides a means for increasing the accuracy of a continuous loading system while substantially reducing the costs for new equipment and while virtually eliminating any downtime requirements. The present invention also provides a means for constructing a new loading system.

The present invention relates to the combination of a continuous loading system and a batch loading system. The continuous loading system is designed with weight feedback controls so partially filled weight of each railroad car after being loaded from the continuous loading system is as close as possible to the control weight while still substantially assuring that the partially filled weight of all of the railroad cars will not exceed the maximum permissible weight.

By designing the continuous loading system in this manner, the cost of the batch loading system is minimized, since the total system is designed to utilize the smallest possible batch loading system.

Assuming that a continuous loading system, already is in place, the present invention also contemplates the upgrading of that system. In upgrading the existing system, the weight feedback controls are added to the continuous loading system for controlling the partially filled weight so the partially filled weight is as close as possible to the control weight while still substantially assuring that the partially filled weight of all of the railroad cars will not exceed the maximum permissible weight. By doing this, the weight of the coal to be loaded by the batch loading system is reduced to a minimum, thereby substantially reducing the size and cost of the batch loading system. To complete the upgrading, the batch loading system then is added to provide the combination of the continuous loading system and the batch loading system.

Figure 1:
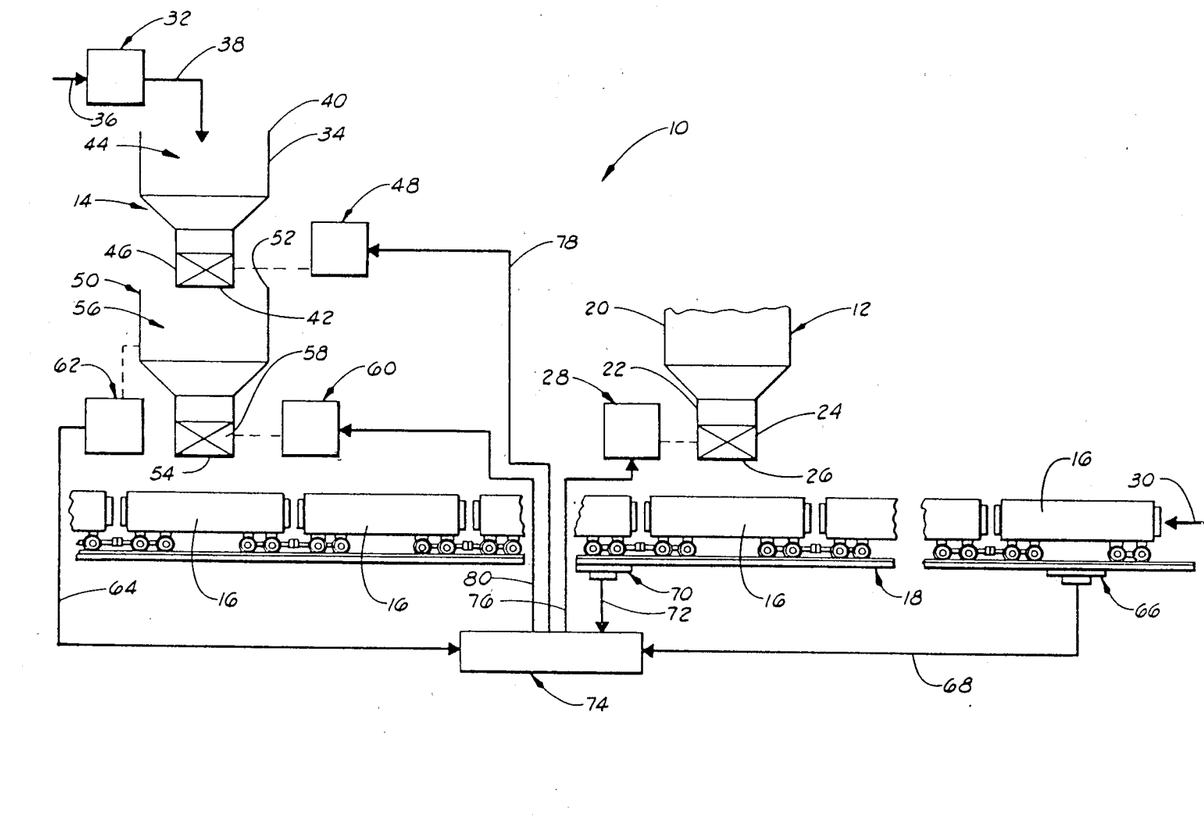

The system of the present invention is shown diagramatically in the drawing and designated therein by the general reference numeral 10. The system 10 includes a continuous loading system 12 and a batch loading system 14 for loading particles such as coal into railroad cars 16, rollingly supported on a railroad track 18, only some of the railroad cars 16 being designated by a reference numeral in the drawing.

A maximum permissible weight of a railroad car filled with particles is known or, at least, predetermined. A weight then is established and this target weight is less than the maximum permissible weight and this target weight is referred to herein as a predetermined "control weight". The system 10 is constructed and adapted to fill the railroad cars 16 with particles so a filled weight of each railroad car (the weight of the railroad car plus the weight of the particles disposed therein) more nearly approximates the control weight without exceeding the maximum permissible weight.

The continuous loading system 12 includes a mass storage bin 20 (partially shown in the drawing) for storing a quantity of coal (particles), and the coal (particles) is dischargable from the mass storage bin 20 through a chute 22. A bin gate 24 is disposed in the chute 22 and the bin gate 24 has an opened and a closed position. Coal (particles) stored in the mass storage bin 20 is dischargable through a discharge end 26 of the chute 22 in the opened position of the bin gate 24 and, in the closed position of the bin gate 24, the bin gate 24 blocks the chute 22 and prevents coal (particles) from being discharged through the chute 22.

A bin gate actuator 28 is mechanically connected to the bin gate 24. The bin gate actuator 28 is adapted to move the bin gate 24 to the opened position in response to receiving an open signal and to move the bin gate 24 to the closed position in response to receiving a close signal.

The mass storage bin 20 is supported from the ground by structures well known in the art, but not shown in the drawings, so the discharge end 26 of the chute 22 is supported a predetermined distance above the ground. More particularly, the discharge end 26 of the chute 22 is supported a distance above the ground so the railroad cars 16 can move in a direction of travel 30 under the discharge end 26 of the chute 22 during the loading operations.

The batch loading system 14 includes a coal transport system 32 which is adapted to transfer coal (particles) from a storage location and discharge the coal into a surge bin 34. The coal (particles) loading into the coal transport system 32 is indicated in the drawing by an arrow designated by the reference numeral 36 and the coal (particles) discharging from the coal transport system 32 into the surge bin 34 is diagramatically indicated in the drawing by the arrow designated by the numeral 38.

The surge bin 34 has an upper open end 40 and a lower discharge end 42. The surge bin 34 includes a storage space 44 and the coal transport system 32, more particularly, is adapted to discharge coal (particles) through the open upper end 40 and into the storage space 44 of the surge bin 34.

The surge bin 34 includes a surge gate 46 (one or more gates) which is connected to the discharge end 42 of the surge bin 34. The surge gate 46 is in communication with the storage space 44. The surge gate 46 has an opened and a closed position. In the closed position of the surge gate 46, the coal (particles) is blocked or prevented from being discharged from the discharge end 42 of the surge bin 34 and, in the opened position of the surge gate 46, coal (particles) is permitted to be discharged through the discharge end 42 of the surge bin 34.

A surge gate actuator 48 is mechanically connected to the surge gate 46. The surge gate actuator 48 is adapted to move the surge gate 46 to the opened position in response to receiving an open signal and to move the surge gate 46 to the closed position in response to receiving a close signal.

The batch loading system 14 also includes a weigh bin 50 having an open upper end 52 and a lower discharge end 54. A storage space 56 is formed in a portion of the weigh bin 50 and a weigh gate 58 is operatively connected to the discharge end 54 of the weigh bin 50. The weigh gate 58 has an opened and a closed position and the weigh gate 58 is in communication with the storage space 56 in the weight bin 50. In the opened position of the weigh gate 58, coal (particles) is discharged through the discharge end 54 of the weigh bin 50 and, in the closed position of the weigh gate 58, coal (particles) is blocked or prevented from being discharged through the discharge end 54 of the weigh bin 50.

A weigh gate actuator 60 is mechanically connected to the weight gate 58. The weigh gate actuator 60 operates to move the weight gate 58 to the opened position in response to receiving an open signal and the weigh gate actuator 60 operates to move the weigh gate 58 to the closed position in response to receiving a close signal.

The surge bin 34 is supported by structures (not shown in the drawing) so the discharge end 42 of the surge bin 34 is supported generally above the weigh bin 50 so coal (particles) is discharged through the discharge end 42 of the surge bin 34 and into the storage space 56 in the weigh bin 50.

The weigh bin 50 is supported by structures (not shown in the drawing) so the weigh bin 50 is supported generally above the railroad cars 16. More particularly, the weigh bin 50 is supported so the discharge end 54 of the weigh bin 50 is disposed generally above the railroad cars 16 as the railroad cars 16 move in the direction of travel 30 over the track 18 and under the discharge end 54 of the weigh bin 50 during the loading operations.

A load cell assembly 62 is mechanically connected to the weigh bin 50. The load cell assembly 62 is adapted to weigh the coal (particles) as the coal (particles) is being loaded into the storage space 56 of the weigh bin 50 and the load cell assembly 62 is adapted to provide an output signal on a signal path 64 indicative of the weight of the coal (particles) being loaded into the storage space 56 in the weigh bin 50. The load cell assembly 62 is a dynamic weighing system so that the output signal provided on the signal path 64 provides a continuous indication of the weight of the coal (particles) in the storage space 56 of the weigh bin 50 as the coal (particles) is being loaded into the storage space 56 of the weigh bin 50.

A light weighing assembly 66 is disposed beneath the track 18. The light weighing assembly 66 is disposed a distance in a direction, opposite the direction of travel 30, from the discharge end 26 of the chute 22, so each of the railroad cars 16 passes over the light weighing assembly 66 prior to the railroad car 16 passing under the chute 22 of the continuous loading system 12. The light weighing assembly 66 preferably is an in-motion track scale and is constructed to weigh each railroad car 16 positioned on the track 18 above the light weighing assembly 66 while the railroad car 16 is moving over the track 18 in the direction of travel 30. The light weighing assembly 66 also is constructed and adapted to provide an output signal on a signal path 68 indicative of the weight of the railroad car 16 weighed by the light weighing assembly 66.

A partially loaded weighing assembly 70 is disposed beneath the track 18 and the partially loaded weighing assembly 70 is positioned generally between the continuous loading system 12 and the batch loading system 14. The partially loaded weighing assembly 70 also is of the type commonly referred to as an in-motion track scale and the partially loaded weighing assembly 70 is adapted to weigh each railroad car 16 positioned on the track 18 above the partially loaded weighing assembly 70 while the railroad car 16 is moving in the direction of travel 30. The partially loaded weighing assembly 70 also is constructed and adapted to provide an output signal on a signal path 72 indicative of the weight of the railroad car 16 weighed by the partially loaded weighing assembly 70.

Each railroad car 16 is rollingly supported on the track 18 by a front and a rear wheel assembly. The weighing assemblies 66 and 70 each, more particularly, weighs the load carried by the front and the rear wheel assemblies and these weights then are added to determine the weight of the railroad car 16, the total weight being the weight outputted on the signal paths 68 and 72.

Only portions of the continuous loading system 12 and the batch loading system 14 have been shown in the drawing and described herein. The remaining details relating to the construction and operation of these two systems 12 and 14 are described in U.S. Pat. Nos. 4,629,392 and 4,460,308, referred to before and such other details will not be repeated specifically herein.

The system 10 of the present invention also includes a processor(s) 74 which may be any suitable general purpose digital computer. In practice, the processor 74 may comprise more than one physical processor. The processor 74 is adapted to receive the signals outputted by the weighing assemblies 66 and 70 on the signal paths 68 and 72, respectively.

The processor 74 also is adapted to output the open and close signals on a signal path 76 to the bin gate actuator 28, to output the open and close signals on a signal path 78 to the surge gate actuator 48 and to output the open and close signals on a signal path 80 to the weigh gate actuator 60. Also, the processor 74 is adapted to receive the signals outputted by the load cell assembly 62 on the signal path 64.

For various reasons generally described in the two U.S. patents mentioned before, it is desirable to fill or load each railroad car 16 with coal (particles) so that the filled weight (the weight of railroad car 16 loaded with coal or other particles) is as close as possible to the control weight without exceeding the maximum permissible weight, and the system 10 of the present invention is designed to achieve this goal.

Initially, the railroad cars 16 are moved along the track 18 in the direction of travel 30 until the first railroad car 16 is moved over the light weighing assembly 66. The light weighing assembly 66 weighs the first railroad car 16 and determines the total unfilled weight of the first railroad car 16. The light weighing assembly 66 outputs a signal over the signal path 68 indicative of the unfilled weight of the first railroad car 16. The signal on the signal path 68 is received by the processor 74 and the processor 74 is programmed to store the unfilled weight along with a car identification code uniquely identifying this unfilled weight as being associated with the first railroad car.

Programmed in the processor 74 is a predetermined preset partial weight which is less than the control weight. The preset partial weight is the desired weight of the railroad car 16 after the railroad car 16 has been filled with coal (particles) utilizing the continuous loading system 12.

As mentioned before, a continuous loading system does not load an exact amount of coal (particles) into railroad cars. Rather, when utilizing a continuous loading system, some of the railroad cars will be overfilled so that the filled weight exceeds a desired preset, control weight, some of the railroad cars will be underloaded so that the filled weight is less than the desired preset, control weight, most of the railroad cars will have a filled weight about equal to the desired preset, control weight and some of the railroad cars will be overloaded to an extent such that the filled weight exceeds the maximum permissible weight. This weight distribution falls generally within a bell-shaped curve when the filled weights of the railroad cars are plotted as a function of the each weighed railroad car.

It, of course, is desired to have the final filled weight of each of the railroad cars as close as possible to the control weight without exceeding the maximum permissible weight. Thus, it is very undesirable to have the filled weight of any of the railroad cars exceed the maximum permissible weight. The weight distribution problem generally described before with respect to the continuous loading system can be solved by lowering the desired preset, control weight to a weight substantially below the maximum permissible weight so that, even though filled weights still are distributed in the manner described before, none of the filled weights possibly could exceed the maximum permissible weight. However, if this is done, most of the railroad cars will be underfilled and many of the railroad cars will be substantially underfilled. This also is an undesired result.

The preset partial weight in accordance with the present invention is determined to be a weight less than the maximum permissible weight and less than the control weight by an amount sufficient to assure that substantially none of the railroad cars 16 will be overloaded to an extent that the weight of the railroad car 16 loaded by the continuous loading system 12 exceeds the maximum permissible weight. Obviously, the partially filled weight could be set substantially below the maximum permissible weight so that no railroad car 16 possibly could be loaded to such an extent that the filled weight exceeds the maximum permissible weight, as mentioned before. However, the difference between the partially filled weight and the control weight represents the amount of coal (particles) which must be loaded by the batch loading system 14. Thus, is is desirable to maintain this difference as small as possible, because the cost of the batch loading system 14 equipment increases as this difference increases, and it is desirable to maintain the cost of the batch loading system 14 equipment as low as possible.

Thus, in accordance with the present inventions, the preset partial weight is less than the maximum permissible weight and less than the control weight by an amount about only sufficient substantially to assure that substantially no railroad car 16 will be overloaded to an extent that the weight of the partially loaded railroad car 16 (the railroad car 16 loaded by the continuous loading system 12) exceeds the maximum permissible weight.

It should be noted that there are practical limits in the sense that the size of the batch loading system can be reduced only to a practical lower limit. In other words, after the difference between the partially filled weight and the control weight is reduced to a certain minimum weight representing the size of the smallest practical batch loading system, further reductions in this difference will not result in any further savings in batch loading system 14 equipment, although such further reductions may result in some reduced operational expenses.

In response to receiving the signal indicative of the unfilled weight of the first railroad car 16, the processor 74 determines a first difference weight to be the difference between the unfilled weight of the first railroad car 16 and the preset partial weight.

The continuous loading system 12 senses the leading edge of the first railroad car 16 and determines when the first railroad car 16 is positioned under the chute 22 in a position such that loading may commence in the manner described in U.S. Pat. No. 4,460,208, and a signal to that effect is inputted into the processor 74. In response to receiving a signal indicating that the first railroad car 16 properly is positioned under the chute 22, the processor 74 provides the open signal on the signal path 76. The open signal on the signal path 76 is received by the bin gate actuator 28 and, in response to receiving the open signal, the bin gate actuator 28 causes the bin gate 24 to be positioned in the opened position, thereby causing coal (particles) to be discharged through the discharge end 26 of the chute 22 and into the first railroad car 16.

The coal (particles) continues to be discharged through the discharge end 26 of the chute 22 as the first railroad car 16 moves under the chute 22 in the direction of travel 30. The continuous loading system 12 also includes means (not shown in the drawing) for sensing the trailing end of the first railroad car 16 relative to various predetermined positions and signals are provided to the processor 74 indicative of the positions of the trailing end of the first railroad car 16 relative to the discharge end 26 of the chute 22, in the manner described in U.S. Pat. No. 4,460,308. The processor 74 is programmed to provide the close signal on the signal path 76 in response to determining the position of the trailing end of the first railroad car 16. In other words, the processor 74 controls the time during which the bin gate 24 is in the opened positions thereby controlling the amount of coal (particles) loaded into the first railroad car 16 to be about equal to the first differential weight. In response to receiving the close signal on the signal path 76, the bin gate actuator 28 causes the bin gate 24 to be moved to the closed position thereby terminating the discharging of coal (particles) through the discharged end 26 of the chute 22.

The first railroad car 16 continues to move along the track 18 after being partially filled with coal by the continuous loading system 12 until the first railroad car 16 moves over the partially loaded weighing assembly 70. The partially loaded weighing assembly 70 weighs the partially loaded first railroad car 16 in a manner similar to that described before with respect to the light weighing assembly 66, and the partially loaded weighing assembly 70 then outputs a signal on the signal path 72 indicative of the partially filled weight of the first railroad car 16. The partially filled weight outputted on the signal path 72 is received by the processor 74.

If the partially filled weight exceeds the preset partial weight, the processor 74 adjusts the closing of the bin gate 24 so that the bin gate 24 closes in a shorter period of time. If the partially filled weight is less than the preset partial weight, the processor 74 adjusts the closing of the bin gate 24 so that the bin gate 24 remains opened for a longer period of time. This feedback to control the operation of the continuous loading system 12 is necessary to enable the partially filled weight to be as close as possible to the control weight while substantially assuring that the partially filled weight does not exceed the maximum permissible weight. It is this type of feedback which permits the use of the continuous loading system 12 in combination with the batch loading system 14 wherein the batch loading system 14 is of minimum size, as will be discussed below.

The processor 74 receives and stores the partially filled weight of the first railroad car 16 and the processor 74 then determines a second difference weight which is the difference between the control weight and the partially filled weight. The processor 74 then outputs an open signal on the signal path 78 to the surge gate actuator 48. In response to receiving the open signal on the signal path 78, the surge gate actuator 48 causes the surge gate 46 to be moved to the opened position thereby resulting in coal (particles) being discharged through the discharge end 42 of the surge bin 34 and into the storage space 56 in the weigh bin 50. As the coal (particles) is being discharged from the surge bin 34 into the weigh bin 50, the weight of the coal (particles) being discharged into the weigh bin 50 continuously is being weighed by the load cell assembly 62, and the load cell assembly 62 continuously outputs a signal on the signal path 64 indicative of the weight of the coal (particles) being loaded into the weigh bin 50 from the surge bin 34.

The signals on the signal paths 64 indicative of the weight of the coal (particles) being loaded into the weigh bin 50 are received by the processor 74 and the processor 74 is programmed to continuously compare the weight indicated by the signals on the signal path 64 with the second difference weight. The processor 74 further is programmed to output the closed signal on the signal path 78 when the weight of the particles being loaded into the weigh bin 50 from the surge bin 34 equals the second difference weight. In response to receiving the close signal on the signal path 78, the surge gate actuator 48 causes the surge gate 46 to be moved to the closed position thereby terminating the discharging of coal from the surge bin 34. The weight of the coal in the weigh bin 50 is statically weighed via the load cell assembly 62.

The first railroad car 16 continues to be moved in the direction of travel 30 along the track 18 until the first railroad car 16 is positioned generally beneath the discharge end 54 of the weigh bin 50 to receive coal (particles) from the weigh bin 50. Although this may be done manually, the batch loading system 14 includes means for sensing the leading end of the first railroad car 16 and for outputting signals to the processor 74 in response to sensing that the leading end of the railroad car 16 is properly positioned beneath the discharge end 54 of the weigh bin 50 to receive coal (particles) from the weigh bin 50. The means for sensing the leading end of a railroad car and outputting signals when the railroad cars are properly beneath weigh bin 50 is described in detail in U.S. Pat. No. 4,629,392 mentioned before.

In response to determining that the first railroad car 16 is properly positioned beneath the discharge end 54 of the weigh bin 50, the processor 74 outputs the open signal on the signal path 80 to the weigh gate actuator 62. In response to receiving the open signal on the signal path 80, the weigh gate actuator 60 causes the weigh gate 58 to be moved to the opened position thereby causing coal (particles) to be discharged through the discharge end 54 of the weigh bin 50 and into the first railroad car 16. Since the weigh bin 50 previously was loaded with an amount of coal (particles) equal in weight to the second difference weight, the coal (particles) discharge through the discharge end 54 of the weigh bin 50 and into the first railroad car 16 will weigh an amount equal to the second difference weight. Since the processor 74 has stored the partially filled weight and the second difference weight associated with the first railroad car 16, the processor 74 then can determine the filled weight of the first railroad car 16 as being a weight equal to the partially filled weight plus the second difference weight. Although, in some applications, it may be desirable to weigh the first railroad car 16 after the first railroad car 16 has been filled with coal (particles) by the batch loading system 14 to determine the filled weight of the first railroad car 16, it has been found that this is not necessary and the determination by the processor 74 of the filled weight as being equal to the partially filled weight of the first railroad car 16 plus the second difference weight associated with the first railroad car 16 is accurate to a sufficient extent.

Each of the remaining railroad cars 16 sequentially is loaded with coal (particles) first by the continuous loading system 12 and then by the batch loading system 14 in a manner exactly like that described before with respect to the first railroad car 16 and this process is repeated until all of the railroad cars 16 in a unit train have been filled with coal (particles).

The load cell assembly 62, more particularly, is designed to continuously output signals on the signal paths 64 indicative of the weight of the coal (particles) being loaded into the weigh bin 50 from the surge bin 34 in the manner described before and to continuously output signals on the signal path 64 indicative of weight of the coal (particles) in the weigh bin 50 as the coal is being discharged through the discharge end 54 of the weigh bin 50. In some instances, it is possible that an amount of coal (particles) is discharged from the surge bin 34 into the weigh bin 50 having a weight in excess of the second difference weight. Since the processor 74 continuously receives the signals on the signal paths 64 indicative of the weight of the coal (particles) being loaded into the weigh bin 50, the processor 74 is programmed to determine if and when an amount of coal (particles) has been loaded into the weigh bin 50 in excess of the second difference weight. In response to this condition, the processor 74 then outputs the close signal on the signal path 80 to terminate the discharging of coal (particles) from the weigh bin 50 before all of the coal has been discharged when an amount of coal (particles) remains in the weigh bin 50 equal to the predetermined excess above the second difference weight. This is termed "weigh down". The remaining coal in the weight bin 50 then is statically weighed via the load cell assembly 62. The processor 74 utilizes this excess weight of coal (particles) remaining in the weigh bin 50 after the terminating of the discharging of coal (particles) from the weigh bin 50 to determine the weight of coal delivered to the railroad car. If the excess weight exceeds the amount of coal (particles) to be loaded into the next railroad car, the coal is loaded into the next railroad car in a weigh down mode of operation. If the excess weight is less than the amount of coal (particles) to be loaded into the next railroad car, coal is loaded into the weight bin 50 in the "weigh up" mode of operation.

It also should be noted that, in some instances, a separate processor may be associated with each of the weighing assemblies 66 and 70 for adding the front wheel assembly weight and the rear wheel assembly weight of each of the railroad cars 16 and outputting a total weight of each of the weighed railroad car 16 to the processor 74.

Utilizing the system 10 of the present invention and in one operational embodiment, the control weight was determined to be 263,000 pounds with the maximum permissible weight being 265,000 pounds. In this embodiment, the continuous loading system 12 was designed to load an amount of coal into each railroad car 16 such that the partially filled weight was five to ten tons less than the control weight of 263,000 pounds. Thus, in this instances, the batch loading system 14 was constructed to have a loading capacity of about fourteen tons. If only the batch loading system 14 was utilized to load the railroad cars 16 in this example, the batch loading system 14 would have to be constructed to have a capacity of about 200,000 pounds, rather than the five to ten tons, which would represent a substantial increase in the cost of the batch loading system 14 equipment. Utilizing the combination of the continuous loading system 12 and the batch loading system 14, it thus is possible to reduce substantially the cost of the batch loading system 14 equipment and yet still have a loading system capable of loading coal into the railroad cars in an amount so that the filled weight of each of the railroad cars 16 more nearly approximates the control weight without exceeding a maximum permissible weight. It has been found the preset partial weight preferably is set so that the second difference weight is a weight in a range from about four percent to about eight percent of the control weight. Since the control weight is about equal to, but less than, the maximum permissible weight, this range also applies, to the maximum permissible weight.

Assuming an existing continuous loading system for loading coal into railroad cars, the existing continuous loading system easily could be modified to operate in the manner exactly like that described before with respect to the continuous loading system 12 and then this existing system easily could be up-graded to include the batch loading system 14, thereby providing a total system for more accurately loading coal into each of the railroad cars 16. When a loading system is up-graded in this manner, the existing continuous loading system can continue to be utilized for loading coal into the railroad car 16 while the batch loading system 14 is being constructed and thus there is no downtime in the loading operations while up-grading the loading system to incorporate the present invention. The present invention thus provides a means for up-grading a continuous loading system to more accurately load coal into railroad cars 16 in a manner which reduces downtime and substantially reduces the investment cost of the additional batch loading system equipment. Further, it should be noted that in some instances it may be desirable to construct an entirely new loading system incorporating both the continuous loading system 12 and the batch loading system 14.

Changes may be made in the construction and operation in the various components and elements described herein and changes may be made in the steps or in the sequence of steps of the methods described herein without departing from the spirit and scope of the invention as defined in the following claims.

We claim:

1. A method for loading particles into railroad cars wherein a control weight of a railroad car loaded with particles is established and a maximum permissible weight of a railroad car loaded with particles is known, the control weight being less than the maximum permissible weight, including a continuous loading system wherein particles are dischargable through a discharge end of a mass storage bin and wherein a bin gate is connected to the discharge end of the mass storage bin having an opened and a closed position, the particles being dischargable through the discharge end of the mass storage bin in the opened position of the bin gate for loading the particles into a railroad car under the mass storage bin and the particles being prevented from being discharged from the mass storage bin in the closed position of the bin gate, and including a batch loading system wherein particles are dischargable through a discharge end of a weigh bin and wherein a weigh gate is connected to the discharge end of the weigh bin having an opened and a closed position, the particles being dischargable through the discharge end of the weigh bin in the opened position of the weigh gate for loading particles into railroad cars and the particles being prevented from being discharged from the weigh bin in the closed position of the weigh gate, the railroad cars continuously moving under the mass storage bin and the weigh bin in a direction of travel, and wherein particles are dischargable through the discharge end of a surge bin into the weigh bin and wherein a surge gate is connected to a discharge end of the surge bin having an opened and a closed position, the particles being dischargeable through the discharge end of the surge bin for loading the particles into the weigh bin in the opened position at the surge gate and the particles being prevented from being discharged from the surge bin in the closed position of the surge gate, comprising the steps of:

- weighing each railroad car prior to loading particles into the railroad car to determine an unfilled weight of each railroad car;
- comparing the unfilled weight of each railroad car with a preset partial weight to determine a first difference weight for each railroad car and storing each first difference weight along with an associated car identification code uniquely identifying the particular railroad car associated with each first difference weight, the preset partial weight being a weight less than the control weight by an amount sufficient substantially to assure that no railroad car will be overloaded from the mass storage bin by an amount such that the weight of the railroad car loaded with particles exceeds the maximum permissible weight, and the partial preset weight being as close as possible to the control weight while still substantially assuring that the partially filled weight of none of the railroad cars exceeds the maximum permissible weight, thereby minimizing the weight of the coal to be loaded by the batch loading system;
- loading particles from the mass storage bin into each railroad car and terminating the loading of particles from the mass surge bin when about the first difference weight of particles has been loaded into each railroad car;
- weighing each of the railroad cars after loading the railroad cars with particles from the mass storage bin to determine a partially filled weight of each of the railroad cars and determining a second difference weight equal to the difference between the control weight and the partially filled weight;
- adjusting the amount of particles loaded into the railroad cars from the mass storage bin in response to the determined second difference weight whereby the amount of particles loaded into the railroad cars from the mass storage bin in as close as possible to the first difference weight;
- loading particles from the surge bin into the weigh bin prior to unloading particles from the weigh bin into the railroad cars;
- weighing the particles in the weigh bin as the particles are being loaded into the weigh bin and terminating the loading of particles into the weigh bin when a weight of particles has been loaded into the weigh bin about equal to the second difference weight associated with the railroad car to be loaded with that second difference weight of particles; and
- loading the second difference weight of particles from the weigh bin into the railroad car to be loaded with that second difference weight of particles.

2. The method of claim 1 wherein the preset partial weight is a weight in a range from about 4 percent to about 8 percent of the maximum permissible weight.

3. The method of claim 1 wherein the steps of loading particles from the surge bin into the weigh bin and weighing the particles loaded into the surge bin are defined further to include the steps of:

- weighing the particles being loaded into the weigh bin from the surge bin and determining an excess weight equal to the weight of particles loaded into the weigh bin less the second difference weight; and
- weighing the particles in the weigh bin as the particles are being discharged from the weigh bin into the railroad car and terminating the discharging of particles from the weigh bin when the weight of the particles in the weigh bin is about equal to the excess weight.

4. The method of claim 3 wherein the steps of loading particles from the surge bin into the weigh bin and weighing the particles loaded into the surge bin are defined further to include:

- weighing the particles in the weigh bin including the excess weight of particles already in the weigh bin as the particles are being loaded into the weigh bin from the surge bin and terminating the loading of particles into the weigh bin when the weight of the particles in the weigh bin is about equal to the second difference weight associated with the railroad car to be loaded with the second difference weight of particles.

5. A method of improving a continuous loading system for loading particles into railroad cars wherein a control weight is established and a maximum permissible weight of a railroad car loaded with particles is known, the control weight being less than the maximum permissible weight, and wherein particles are dischargable through a discharge end of a mass storage bin and wherein a bin gate is connected to the discharge end of the mass storage bin having an opened and a closed position, the particles being dischargable through the discharge end of the mass storage bin in the opened position of the bin gate for loading particles into a railroad car under the mass storage bin and the particles being prevented from being discharged from the mass storage bin in the closed position of the bin gate, the railroad cars continuously moving under the mass storage bin in a direction of travel, comprising the steps of:

installing a batch loading system spaced a distance in the direction of travel from the continuous loading system wherein particles are dischargable through a discharge end of a weigh bin and wherein a weigh gate is connected to the discharge end of the weigh bin having an opened and a closed position, the particles being dischargable through the discharge end of the weigh bin in the opened position of the weigh gate for loading particles into the railroad cars and the particles being prevented from being discharged from the weigh bin in the closed position of the weigh gate, and wherein a surge gate is connected to a discharge end of a surge bin having an opened and a closed position, the particles being dischargable through the discharge end of the surge bin for loading the particles into the weigh bin in the opened position of the surge gate and the particles being prevented from being discharged from the surge bin in the closed position of the surge gate;

weighing each railroad car prior to loading particles into the railroad car to determine an unfilled weight of each railroad car;

comparing the unfilled weight of each railroad car with a preset partial weight to determine a first difference weight for each railroad car and storing each first difference weight along with an associated car identification code uniquely identifying the particular railroad car associated with each first difference weight, the preset partial weight being a weight less than the control weight by an amount sufficient substantially to assure that no railroad car will be overloaded from the mass storage bin by an amount such that the weight of the railroad car loaded with particles exceeds the maximum permissible weight, and the partial preset weight being as close as possible to the control weight while still substantially assuring that the partially filled weight of none of the railroad cars exceeds the maximum permissible weight, thereby minimizing the weight of the coal to be loaded by the batch loading system;

loading particles from the mass storage bin into each railroad car and terminating the loading of particles from the mass surge bin when about the first difference weight of particles has been loaded into each railroad car;

weighing each of the railroad cars after loading the railroad cars with particles from the mass storage bin to determine a partially filled weight of each of the railroad cars and determining a second difference weight equal to the difference between the control weight and the partially filled weight;

adjusting the amount of particles loaded into the railroad cars from the mass storage bin in response to the determined second difference weight whereby the amount of particles loaded into the railroad cars from the mass storage bin in as close as possible to the first difference weight;

loading particles from the surge bin into the weigh bin prior to unloading particles from the weigh bin into the railroad cars;

weighing the particles in the weigh bin as the particles are being loaded into the weigh bin and terminating the loading of particles into the weigh bin when a weight of particles has been loaded into the weigh bin about equal to the second difference weight associated with the railroad car to be loaded with that second difference weight of particles; and loading the second difference weight of particles from the weigh bin into the railroad car to be loaded with that second difference weight of particles.

6. The method of claim 5 wherein the preset partial weight is a weight in a range from about 4 percent to about 8 percent of the maximum permissible weight.

7. The method of claim 5 wherein the steps of loading particles from the surge bin into the weigh bin and weighing the particles loaded into the surge bin are defined further to include the steps of:

weighing the particles being loaded into the weigh bin from the surge bin and determining an excess weight equal to the weight of particles loaded into the weigh bin less the second difference weight; and weighing the particles in the weigh bin as the particles are being discharged from the weigh bin into the railroad car and terminating the discharging of particles from the weigh bin when the weight of the particles in the weigh bin is about equal to the excess weight.

8. The method of claim 7 wherein the steps of loading particles from the surge bin into the weigh bin and weighing the particles loaded into the surge bin are defined further to include:

weighing the particles in the weigh bin including the excess weight of particles already in the weigh bin as the particles are being loaded into the weigh bin from the surge bin and terminating the loading of particles into the weigh bin when the weight of the particles in the weigh bin is about equal to the second difference weight associated with the railroad car to be loaded with the second difference weight of particles.

9. A method for loading particles into railroad cars wherein a control weight of a railroad car loaded with particles is established, including a continuous loading system wherein particles are dischargable through a discharge end of a mass storage bin, and a batch loading system wherein particles are dischargable through a discharge end of a weigh bin, the railroad cars continuously moving under the mass storage bin and the weigh bin in a direction of travel, and wherein particles are dischargable through the discharge end of a surge bin into the weigh bin, comprising the steps of:

weighing each railroad car prior to loading particles into the railroad car to determine an unfilled weight of each railroad car;

comparing the unfilled weight of each railroad car with a preset partial weight to determine a first difference weight for each railroad car and storing each first difference weight along with an associated car identification code uniquely identifying the particular railroad car associated with each first difference weight, the preset partial weight being a weight less than the control weight by an amount sufficient substantially to assure that no railroad car will be overloaded from the mass storage bin by an amount such that the weight of the railroad car loaded with particles exceeds the control weight, and the partial preset weight being as close as possible to the control weight while still substantially assuring that the partially filled weight of none of the railroad cars exceeds the maximum permissible weight, thereby minimizing the weight of the coal to be loaded by the batch loading system;

loading particles from the mass storage bin into each railroad car and terminating the loading of particles from the mass surge bin when about the first difference weight of particles has been loaded into each railroad car;

weighing each of the railroad cars after loading the railroad cars with particles from the mass storage bin to determine a partially filled weight of each of the railroad cars and determining a second difference weight equal to the difference between the control weight and the partially filled weight;

adjusting the amount of particles loaded into the railroad cars from the mass storage bin in response to the determined second difference weight whereby the amount of particles loaded into the railroad cars from the mass storage bin in as close as possible to the first difference weight;

loading particles from the surge bin into the weigh bin prior to unloading particles from the weigh bin into the railroad cars;

weighing the particles in the weigh bin as the particles are being loaded into the weigh bin and terminating the loading of particles into the weigh bin when a weight of particles has been loaded into the weigh bin about equal to the second difference weight associated with the railroad car to be loaded with that second difference weight of particles; and loading the second difference weight of particles from the weigh bin into the railroad car to be loaded with that second difference weight of particles.

10. The method of claim 9 wherein the preset partial weight is a weight in a range from about 4 percent to about 8 percent of the control weight.

11. The method of claim 9 wherein the steps of loading particles from the surge bin into the weigh bin and weighing the particles loaded into the surge bin are defined further to include the steps of:

weighing the particles being loaded into the weigh bin from the surge bin and determining an excess weight equal to the weight of particles loaded into the weigh bin less the second difference weight; and weighing the particles in the weigh bin as the particles are being discharged from the weigh bin into the railroad car and terminating the discharging of particles from the weigh bin when the weight of the particles in the weigh bin is about equal to the excess weight.

12. The method of claim 11 wherein the steps of loading particles from the surge bin into the weigh bin and weighing the particles loaded into the surge bin are defined further to include:

weighing the particles in the weigh bin including the excess weight of particles already in the weigh bin as the particles are being loaded into the weigh bin from the surge bin and terminating the loading of particles into the weigh bin when the weight of the particles in the weigh bin is about equal to the second difference weight associated with the railroad car to be loaded with the second difference weight of particles.

13. A method of improving a continuous loading system for loading particles into railroad cars wherein a control weight is established and wherein particles are dischargable through a discharge end of a mass storage bin, the railroad cars continuously moving under the mass storage bin in a direction of travel, comprising the steps of:

installing a batch loading system spaced a distance in the direction of travel from the continuous loading system wherein particles are dischargable through a discharge end of a weigh bin, and wherein particles are dischargable through a discharge end of a surge bin for loading the particles into the weigh bin;

weighing each railroad car prior to loading particles into the railroad car to determine an unfilled weight of each railroad car;

comparing the unfilled weight of each railroad car with a preset partial weight to determine a first difference weight for each railroad car and storing each first difference weight along with an associated car identification code uniquely identifying the particular railroad car associated with each first difference weight, the preset partial weight being a weight less than the control weight by an amount sufficient substantially to assure that no railroad car will be overloaded from the mass storage bin by an amount such that the weight of the railroad car loaded with particles exceeds the control weight; and the partial preset weight being as close as possible to the control weight while still substantially assuring that the partially filled weight of none of the railroad cars exceeds the maximum permissible weight, thereby minimizing the weight of the coal to be loaded by the batch loading system;

loading particles from the mass storage bin into each railroad car and terminating the loading of particles from the mass surge bin when about the first difference weight of particles has been loaded into each railroad car;

weighing each of the railroad cars after loading the railroad cars with particles from the mass storage bin to determine a partially filled weight of each of the railroad cars and determining a second difference weight equal to the difference between the control weight and the partially filled weight;

adjusting the amount of particles loaded into the railroad cars from the mass storage bin in response to the determined second difference weight whereby the amount of particles loaded into the railroad cars from the mass storage bin in as close as possible to the first difference weight;

loading particles from the surge bin into the weigh bin prior to unloading particles from the weigh bin into the railroad cars;

weighing the weigh bin as the particles are being loaded into the weigh bin and terminating the loading of particles into the weigh bin when a weight of particles has been loaded into the weigh bin about equal to the second difference weight associated with the railroad car to be loaded with that second difference weight of particles; and loading the second difference weight of particles from the weigh bin into the railroad car to be loaded with that second difference weight of particles.

14. The method of claim 13 wherein the preset partial weight is a weight in a range from about 4 percent to about 8 percent of the control weight.

15. The method of claim 13 wherein the steps of loading particles from the surge bin into the weigh bin and weighing the particles loaded into the surge bin are defined further to include the steps of:
  weighing the particles being loaded into the weigh bin from the surge bin and determining an excess weight equal to the weight of particles loaded into the weigh bin less the second difference weight; and
  weighing the particles in the weigh bin as the particles are being discharged from the weigh bin into the railroad car and terminating the discharging of particles from the weigh bin when the weight of the particles in the weigh bin is about equal to the excess weight.

16. The method of claim 15 wherein the steps of loading particles from the surge bin into the weigh bin and weighing the particles loaded into the surge bin are defined further to include:
  weighing the particles in the weigh bin including the excess weight of particles already in the weigh bin as the particles are being loaded into the weigh bin from the surge bin and terminating the loading of particles into the weigh bin when the weight of the particles in the weigh bin is about equal to the second difference weight associated with the railroad car to be loaded with the second difference weight of particles.

* * * * *